(12) United States Patent
Koebele et al.

(10) Patent No.: US 10,177,863 B1
(45) Date of Patent: Jan. 8, 2019

(54) TEST SYSTEM AND METHOD FOR OVER THE AIR (OTA) MEASUREMENTS WITH A DYNAMIC ADJUSTABLE GRID

(71) Applicant: Rohde & Schwarz GmbH & Co. KG, Munich (DE)

(72) Inventors: Johannes Koebele, Offenburg (DE); Thorsten Hertel, San Jose, CA (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/726,643

(22) Filed: Oct. 6, 2017

Related U.S. Application Data

(60) Provisional application No. 62/566,637, filed on Oct. 2, 2017.

(51) Int. Cl.
| | |
|---|---|
| *H04B 17/16* | (2015.01) |
| *H04B 17/15* | (2015.01) |
| *H04B 17/10* | (2015.01) |
| *H04B 17/19* | (2015.01) |

(52) U.S. Cl.
CPC ........... *H04B 17/15* (2015.01); *H04B 17/102* (2015.01)

(58) Field of Classification Search
CPC .................... H04B 17/16–17/17; H04B 17/102
USPC ........................................ 455/67.11–67.15
See application file for complete search history.

(56) References Cited

U.S. PATENT DOCUMENTS

| | | | | |
|---|---|---|---|---|
| 9,964,577 B2* | 5/2018 | Qi | .......................... | H04B 17/29 |
| 2018/0027434 A1* | 1/2018 | Foegelle | .............. | H04W 24/06 |

OTHER PUBLICATIONS

CTIA, "Test Plan for Wireless Device Over-the-Air Performance", CTIA Everything Wireless, The Wireless Association, Ver. 3.7, https://ctia.org/docs/default-source/certification/ctia-test-plan-for-wireless-device-over-the-air-performance-ver-3-6-1.pdf?sfvrsn=4, Jun. 2017, Sect. 2, pp. 30-34.

Huawei, "Discussion of mmWave UE EIRP and EIS test", R4-1700095, 3GPP TSG-RAN W4G NR AH Meeting, Spokane, WA, USA, Jan. 17-19, 2017, Jan. 17, 2017.

Huawei, "On CDF test point placement on sphere surface", R4-1701335, 3GPP TSG-RAN WG4 Meeting #82, Athens, Greece, Feb. 13-17, 2017, Feb. 13, 2017.

Marsaglia, "Choosing a Point From the Surface of a Spere", The Annals of Mathematical Statistics, McGill Univ., vol. 43, No. 2, pp. 645-646, 1972, 1972.

Rohde & Schwarz, "OTA Performance Test System", Rohde & Schwarz, Product Brochure, R&S TS8991, OTA Performance Test System, Single-source turnkey solutions for cellular and non-cellular wireless testing, Oct. 2016.

\* cited by examiner

*Primary Examiner* — Lee Nguyen
(74) *Attorney, Agent, or Firm* — Potomac Technology Law, LLC

(57) ABSTRACT

A test system for over the air (OTA) measurements of a device under test (DUT) with a dynamic adjustable grid is provided. The system comprises a device under test (DUT), at least one positioner, at least one measurement antenna, and at least one measuring/control device. The measurement antenna is configured to measure several defined measurement points with regard to the device under test, wherein the measurement points are arranged in a grid around the device under test. The configuration of the grid depends on an input value received by the measuring/control device.

18 Claims, 6 Drawing Sheets

TEST SYSTEM AND METHOD FOR OVER THE AIR (OTA) MEASUREMENTS WITH A DYNAMIC ADJUSTABLE GRID

RELATED APPLICATIONS

This application claims the benefit of the earlier filing date under 35 U.S.C. § 119(e) from U.S. Provisional Application Ser. No. 62/566,637 (filed 2017 Oct. 2), which is incorporated herein by reference in its entirety.

TECHNICAL FIELD

The invention relates to a test system and a method for over the air (OTA) measurements of a device under test (DUT), with a dynamic adjustable measurement grid and with the aid of a measurement antenna, a positioner and a measuring/control device.

BACKGROUND

Generally, wireless enabled devices have to pass a variety of industry and regulatory certifications before they can be put on the marked. The certifications include regulatory/compliance testing, such as EMC testing, conformance testing (such as protocol, RF, RRM or LBS), as well as performance testing (such as over the air (OTA) measurements). OTA measurements are specifically performed to measure antenna patterns and include the measurement of the total radiated power (TRP) of a device under test at incremental locations surrounding the device. Other OTA measurements are total isotropic sensitivity (TIS), effective isotropic radiated power (EIRP) and effective isotropic sensitivity (EIS) measurements.

Application Note R&S TS8991 of Rohde & Schwarz, with the title "OTA Performance Test System, Single-source turnkey solutions for cellular and non-cellular wireless testing," relates to an OTA performance test system to analyze and optimize radiated device performance and to validate conformance with industry, network operator and internal company requirements. The document describes the measurement of the TRP, which is a figure of merit for the transmitter performance of a DUT. According to R&S TS8991, the radiation pattern of a device under test is generally measured every 15° in both azimuth and elevation using a measurement antenna. At each position, the EIRP is measured and the TRP corresponds to a spatial average of the EIRP values taken uniformly around the DUT. Alternatively, in addition to the measurement every 15' in both azimuth and elevation, TS8991 discloses a spiral scan approach to perform TRP measurements significantly faster with no loss in accuracy.

Even though TS8991 describes the spiral scan to perform TRP measurements faster, TS8991 is lacks a disclosure of the adjustment of the measurement grid during the measurement to reduce measurement time. Further, TS8991 does not describe any correlation between the grid configuration and at least one parameter of a measured value or data about the DUT. Thus, this document does not disclose an adjustment of the measurement grid in dependence of input data, which allows to decrease test time for OTA measurements while keeping the measurement uncertainty in a reasonable region. Taking into account additional input data, allows to reduce the number of measurement points and thus, to decrease test time, without reducing test accuracy.

What is needed, therefore, is an approach for performance testing of a device under test (DUT) that facilitates the adjustment of the measurement grid based on at least one parameter of at least one measured value or data regarding the DUT.

SOME EXAMPLE EMBODIMENTS

Embodiments of the present invention advantageously address the foregoing requirements and needs, as well as others, by providing a test system and method for performance testing of a device under test (DUT) that facilitates the adjustment of the measurement grid based on at least one parameter of at least one measured value or data regarding the DUT. As referred to herein, the term "measurement grid" may also simply be referred to as a "grid."

According to a first aspect of the invention, a test system for over the air (OTA) measurements of a device under test with a dynamic adjustable grid is provided. The test system comprises a device under test (DUT), at least one positioner, at least one measurement antenna, and at least one measuring/control device. The measurement antenna is configured to measure several defined measurement points with regard to the device under test, wherein the measurement points are arranged in a grid around the device under test, and wherein the configuration of the grid depends on an input value received by the measuring/control device.

Advantageously, the configuration of the measurement grid can be easily modified, since the configuration depends on an input value. Thus, by changing the input value, the configuration of the grid can be changed. Since it is not known, before performing a measurement at a specific measurement point, whether there is a radiation pattern of interest to be measured at the specific measurement point or not, a dynamic adjustment of the measurement grid based on a measurement at the specific measurement point is used to focus the measurement on areas with radiation patterns of interest. By way of example, the configuration described in this document is focused on adjusting the density of the grid to define more or less measurement points. However, the grid configuration can be any distribution of measurement points around a device under test, for example, equidistant distributed measurement points. Measurement points having a higher density at specific areas or any other measurement distribution are conceivable.

According to a first implementation form of the first aspect, the input value is at least one parameter of at least one measured value or data about the device under test.

Advantageously, the input value, which determines the configuration of the measurement grid, is based on a measured radiation pattern of the measurement antenna at a specific measurement point. Thus, the measurement grid can be configured based on the measurements at a specific measurement point. A measured value can exemplarily include power information such as peak power values, average power values, phase information and/or frequency information of the radiation pattern emitted by the DUT. A parameter of a measured value can also include a result of a comparison of the measured value with a defined threshold. It is further conceivable that the measuring/control device receives input data directly from the device under test, exemplarily information about the radiation pattern currently emitted by the device under test. Thus, the configuration of the grid can be adjusted based on the data information about the DUT without taking into account a measured value of a specific measurement point.

According to a further implementation form of the first aspect, the input value is at least one parameter of at least one measured value or data of another device under test.

Advantageously, data from another DUT, other than the DUT that is currently measured, can be used to configure the measurement grid. Thus, data from, for example, a "golden sample" can be used to configure the measurement grid for a device under test. The term "golden sample" means in this context "a sample produced by a manufacturer that is ideal, so that when evaluated (by clients, competitors, inspectors, media, etc.) it can be tested and receive a high standard review." In other words, from previous measurements of a golden sample, it is known at which locations measurement points are required to be able to perform an accurate measurement in an acceptable measurement time. This information can be used to configure the measurement grid for the currently measured DUT.

According to a further implementation form of the first aspect, the measured value or data is taken from an actual or at least one previous measurement.

According to a further implementation form of the first aspect, the configuration of the grid is such that the density of the grid is adjustable and can be decreased or increased.

Advantageously, increasing the grid density allows more measurements in an area of interest, for example when the measured value exceeds a defined threshold the density of the measurement grid is increased which results in a higher number of measurement points in a defined area, and thus more measurements are performed in this area. When the measured value does not exceed the defined threshold, the measurement grid density can be decreased, and thus the density of measurement points is decreased and less measurements are performed, which saves measurement time. The decision of increasing or decreasing the measurement grid density can be taken for every measurement at any measurement point.

According to a further implementation form of the first aspect, the adjustment of the grid is done during the measurement.

Advantageously, when an input value is received by the measuring/control device to increase the measurement grid density during the measurement of the DUT at a specific measurement point, a more detailed measurement around the measurement point can be made, since more measurement points are defined and available. If an input value is received by the measuring/control device to decrease the measurement grid density, less measurement points are defined and therefore less measurements are taken, which saves measurement time and avoids unnecessary measurements.

According to a further implementation form of the first aspect, the adjustment of the grid is done before or after a measurement.

According to a further implementation form of the first aspect, the at least one parameter of at least one measured value is the gradient of the measured value and/or wherein the at least one parameter is a user defined measurement time, and/or wherein the at least one parameter is the result of a comparison of the measured value with a defined threshold.

Advantageously, several criteria for increasing or decreasing the density of the measurement grid can be defined by choosing different parameters of the measurement values such as gradient, power level or by setting values such as a desired measurement time. Since a defined measurement time is a parameter to adjust the measurement grid, the operator can define a desired measurement time, and the measurement grid defines the measurement points such, to complete the measurement within the given time.

It is also conceivable that in addition to the given measurement time, power levels or gradient are considered to configure the measurement grid.

According to a further implementation form of the first aspect, after an input value to increase the density of the grid has been received, starting from the previous measurement point, the measurement is repeated with defined measurement points on a denser grid.

Advantageously, going back to the previous measurement point from the measurement point that triggered increasing the grid density and applying the denser measurement grid allows measurements relevant measurement points that have not been measured before.

According to a further implementation form of the first aspect, the system further comprises a post processing unit.

According to a further implementation form of the first aspect, the post processing unit is configured to calculate from the measurement results at the different measurement points a defined figure of merit, or graph or distribution.

Advantageously, the post processing unit provides additional information for the user, whereby graphical representations of the measurements are also possible to support the user to immediately decide if a measurement is out of range and to determine if a DUT has to be retested and/or reconfigured.

According to a second aspect of the invention, a method for over the air (OTA) measurements with a dynamic adjustable grid is provided. The method comprises configuring a device under test (DUT) to emit desired radiation patterns required by a specific test plan with the aid of the measuring/control device, and measuring radiation emitted by the device under test with the aid of a movable measurement antenna. The method further comprises controlling a movement of the measurement antenna around the device under test with the aid of a positioner controlled by the measuring/control device to define measurement points arranged in a grid around the device under test. The method further comprises receiving an input value by the measuring/control device and configuring the movement of the measurement antenna based on the input value with the aid of the positioner to adjust the configuration of the grid around the device under test.

According to a first implementation form of the second aspect, the method further comprises selecting as an input value at least one parameter of a measured value or data about the device under test or of another device under test with the aid of the measuring/control device.

Advantageously, not only parameters based on performed measurements on a DUT are considered to adjust the measurement grid, but additionally or alternatively, the configuration of the grid can be defined by input data from the DUT itself, which might be beam steering or communication data. Further, input data can be data from another device under test, for example a "golden sample," which has been already tested and thus the location of areas with relevant measurement data are already known.

According to a further implementation form of the second aspect, the method further comprises calculating the gradient of a measured value and/or performing a comparison of the measured value with a defined threshold to determine at least one parameter of at least one measured value.

Advantageously, a measured radiation power value of a specific measurement point can be compared with a given threshold. When the measured value is above the threshold, a signal of interest may be in the area around the measurement point, and thus the measurement grid is configured to get denser and more measurement points are defined. Further, the gradient calculated for a measurement point is an indicator, if a signal of interest is present.

According to a further implementation form of the second aspect, the method further comprises adjusting the density of the grid during a measurement based on the measured value or data.

According to a further implementation form of the second aspect, the method further comprises adjusting the density of the grid before or after a measurement based on the measured value or data, and/or wherein the method further comprises the step of performing an additional measurement starting from a previous measurement point after the grid density has been increased.

According to a further implementation form of the second aspect, the method further comprises selecting as input value a user defined measurement time.

According to a further implementation form of the second aspect, the method further comprises calculating, from the measurement results at the different measurement points, a defined figure of merit, or a graph or a distribution.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

Figure 1:
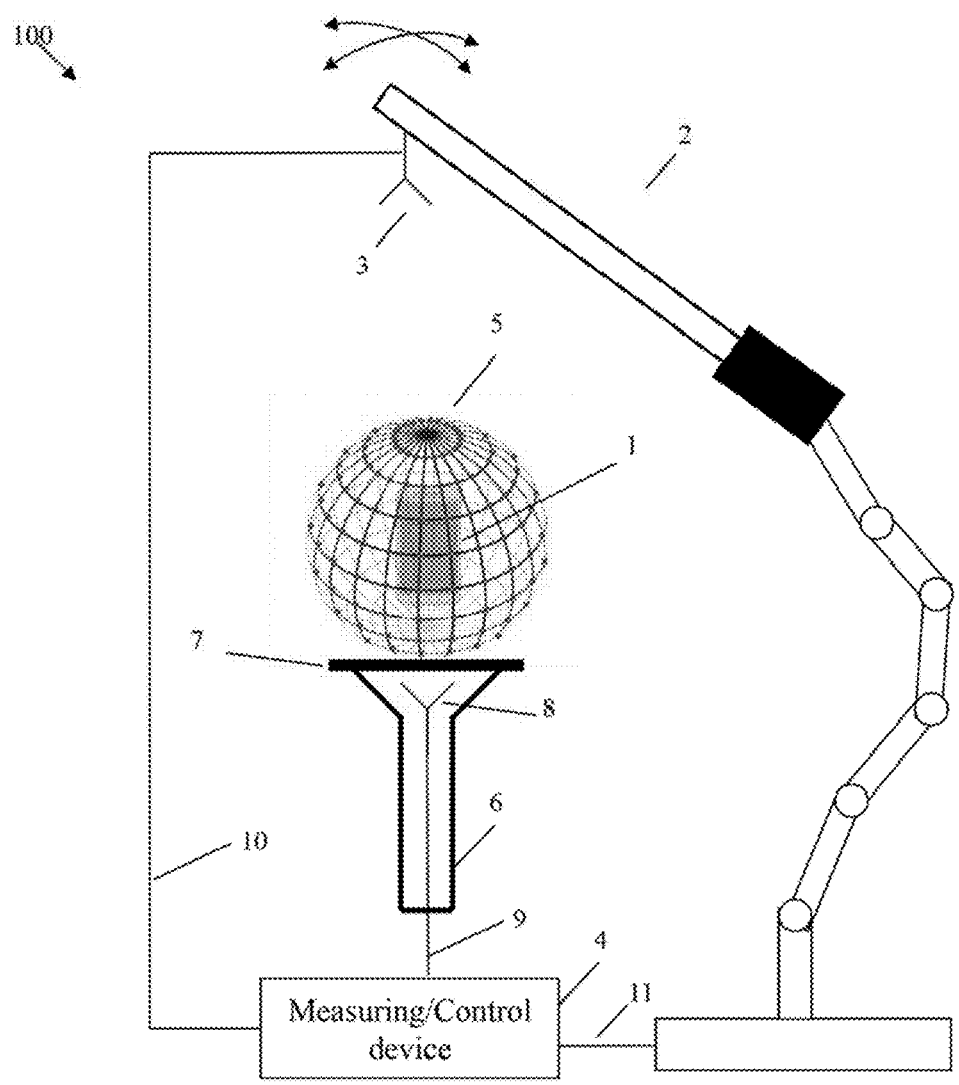
FIG. 1 shows a block diagram of an example test system for over the air (OTA) measurements of a device under test with a dynamic adjustable measurement grid, in accordance with example embodiments of the present invention.

A test system and method for performance testing of a device under test (DUT) that facilitates the adjustment of the measurement grid based on at least one parameter of at least one measured value or data regarding the DUT, are described. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

FIG. 1 shows a block diagram of an example test system 100 for over the air (OTA) measurements of a device under test (DUT) with a dynamic adjustable measurement grid, in accordance with example embodiments of the present invention. The invention is not limited to this embodiment and all features below are explained for the purpose of example only.

The test system 100 comprises a DUT 1, a measurement antenna 3, a link antenna 8, a positioning arm 2 (also referred to herein as a positioner) and a measuring/control device 4, connected to the link antenna 8 via a cable connection 9 and connected to the measurement antenna 3 via a cable connection 10. Further, a shielding 6, 7 of the link antenna 8 is depicted in FIG. 1.

By way of example, the DUT 1 may include a test interface to input/receive beam steering data and/or communication data to/from the device under test.

By way of further example, the measurement antenna 3 may be a single horn antenna that is movable in all directions around the DUT with the aid of the positioner 2. Arm positioners or robotic arms to provide this functionality are well known to the person skilled in the art and are therefore not described within this document.

By way of further example, several antenna elements may be included to form an antenna array, which allows the measurement of the electro-magnetic radiation emitted by the DUT 1, without moving the measurement antenna 3, and/or where the plate on which the DUT is positioned may be rotatable or tiltable.

The measuring/control device 4 is configured to control a beam steering of the DUT 1 to configure the DUT to emit desired radiation patterns and to receive and process signals from the DUT received by the measurement antenna 3. The communication data generated by the measuring/control device 4 and transmitted to the DUT through the link antenna 8 comprises beam steering control data in order to control the beam steering of the DUT.

The measuring/control device 4 is further configured to control the positioner 2 to move the measurement antenna 3 to several defined measurement points with regard to the DUT 1 and the measurement antenna 3 is configured to perform a measurement at each measurement point. The positioner 2 is controlled such that the measurement points are arranged in a grid around the DUT. The sphere 5 depicted in FIG. 1 is an example how the configuration of a measurement grid around the device under test can be defined.

Advantageously, the measurement points arranged in a grid around the DUT are not static but dynamic. In other words, the measurement grid is an adaptive measurement grid. Thus, the configuration of the measurement grid is dynamically adjustable depending on an input value received by the measuring/control device 4. The measuring/control device 4 is therefore configured to adjust the measurement grid based on an input value by controlling the movement of the positioner 2 and/or controlling the receiving properties of the measurement antenna 3.

The measuring/control device 4 is further configured to receive an input value from the measurement antenna 3 or from the DUT 1 or from another DUT (not shown), and to select at least one parameter of at least one measured value or data about the DUT 1 or about another DUT. The measuring/control device 4 is further configured to process the at least one selected parameter to determine a criterion for changing the configuration of the grid. The parameter can be exemplarily the gradient of a measured value at the related measurement point, or a value based on the comparison of the measured value with a threshold. The parameter can further be data about the DUT 1, or about another DUT, providing information about where radiation patterns of interest are located. In addition, the parameter can be a defined measurement time.

Further, FIG. 1 shows a shielding 6, 7 of the link antenna 3 to prevent that radiation generated by the link antenna 8 is received by the measurement antenna 3 and falsifies the measurement result of the OTA.

Figure 2A:
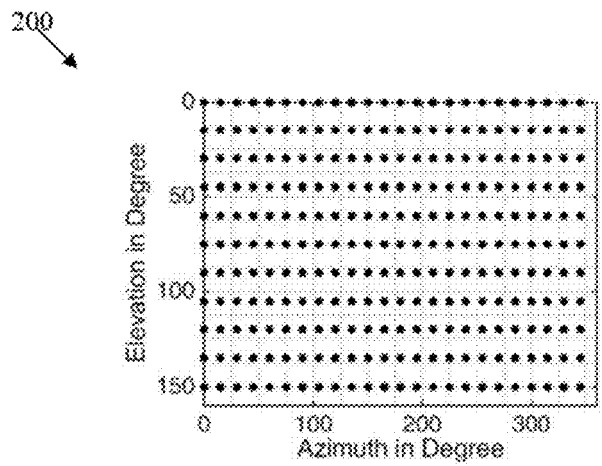
FIG. 2A shows an example constant step size measurement grid as an azimuth/elevation representation and as a sphere representation, in accordance with example embodiments of the present invention.
Figure 2A:
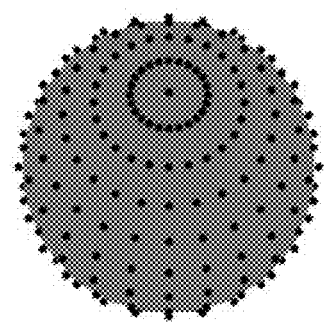
Figure 2B:
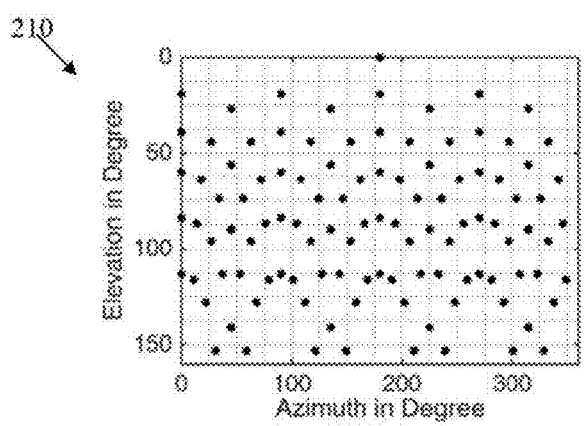
FIG. 2B shows an example constant density measurement grid as an azimuth/elevation representation and as a sphere representation, in accordance with example embodiments of the present invention.
Figure 2B:
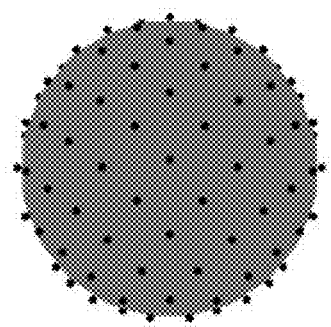

FIG. 2A shows a constant step size measurement grid as an azimuth/elevation representation and as a sphere representation, in accordance with example embodiments of the present invention. The diagram 200 shows measurement points not uniformly distributed on the sphere surface. At the poles, the measurement points are denser than near the equator, however, the same grid drawn in azimuth/elevation representation has uniformly distributed measurement points. FIG. 2B shows a constant density measurement grid as an azimuth/elevation representation and as a sphere representation, in accordance with example embodiments of the present invention. The diagram 210 shows measurement points uniformly distributed in the sphere representation, however, the azimuth/elevation representation shows not uniformly distributed measurement points. FIGS. 2A and 2B present two examples of different possible measurement distributions.

Figure 2C:
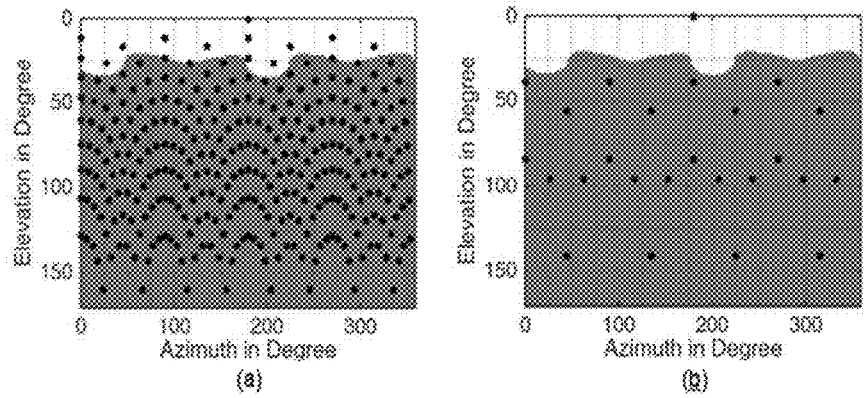
FIG. 2C shows two further example constant density measurement grids as azimuth/elevation representations, in accordance with example embodiments of the present invention.
Figure 2D:
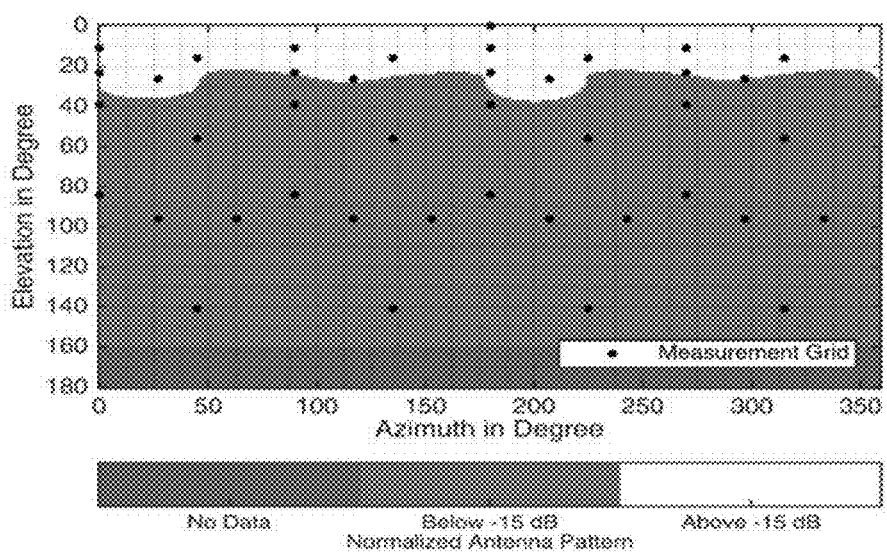
FIG. 2D shows an example adaptive measurement grid, based on the two density grids of FIG. 2C with a normalized gain threshold of −15 dB, as an azimuth/elevation representation, in accordance with example embodiments of the present invention.
Figure 2E:
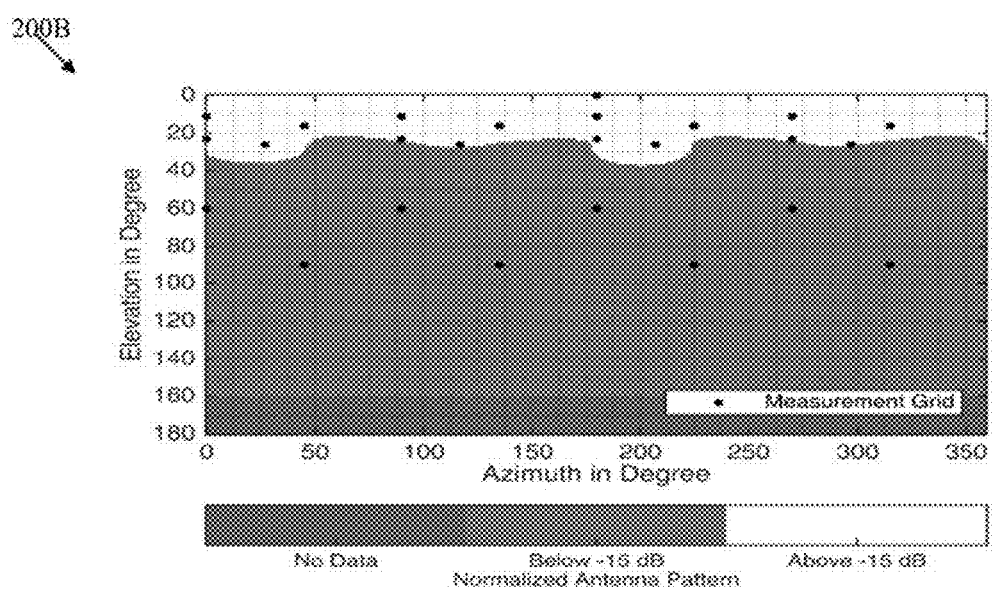
FIG. 2E shows a further example adaptive measurement grid with a normalized gain threshold of −15 dB as an azimuth/elevation representation, in accordance with example embodiments of the present invention.

FIG. 2C shows two further example constant density measurement grids as azimuth/elevation representations, in accordance with example embodiments of the present invention. The diagram 200A shows two different constant density grids, which can be combined in an adaptive density measurement grid. An adaptive density measurement grid adjusts the distribution density of the measurement points according to a specified parameter. In this example, the specified parameter to define a transition criteria between the two different density grids is the normalized gain of the emitting antenna. FIG. 2D shows an example adaptive measurement grid based on the two density grids of FIG. 2C, with a normalized gain threshold of −15 dB, as an azimuth/elevation representation, and FIG. 2E shows a further example adaptive measurement grid, with a normalized gain threshold of −15 dB, as an azimuth/elevation representation, in accordance with example embodiments of the present invention. The different adaptive density grids 210A and 210B (of FIGS. 2D and 2E, respectively) are analyzed to determine the effectiveness of adaptive measurement grids. The analysis has been performed based on a post-processing approach of a known/measured antenna pattern of a standard gain horn antenna.

The diagram 200A(a) (the diagram (a) of FIG. 2C), shows a constant density grid, more specifically a constant density 300 grid with 301 measurement points. The diagram 200A(b) (the diagram (b) of FIG. 2C) shows a constant density grid, more specifically a constant density 30 grid with 25 measurement points. Both density grids are depicted in azimuth/elevation representation. These two different constant density grids can be combined in an adaptive density grid, for example, by using the normalized gain of the antenna emitting the radiation pattern as transition criteria. However, any other transition criteria (such as gradient or power level of a measured value of the radiation pattern, a defined measurement time or the result of the comparison of the gradient or the power level of a measured value with a defined threshold) may also be suitable.

The diagram 210A (of FIG. 2D) shows an example adaptive measurement grid with the two measurement point densities from the diagrams 200A(a) and 200A(b) of FIG. 2C, constant density 300 grid and constant density 30 grid. In this example, the normalized gain of an emitting horn antenna is used to determine the transition between the two density regions, wherein a normalized gain threshold of −15 dB is defined. As can be seen in the diagram 210A of FIG. 2D, the two density regions of the adaptive measurement grid have in total 41 measurement points. The diagram 210A shows that, for measurement points having measured values below the defined threshold, the density of measurement points is taken from constant density 30 grid, and that, for values above the threshold, the measurement points of constant density grid 300 are used. The combination of two different constant measurement grids with two measurement point densities and setting a transition criteria for determining the transition between the two density regions decreases the number of measurement points without noticeably increasing the measurement uncertainty.

The diagram 200B (of FIG. 2E) shows a measurement grid for a radiation pattern emitted by a horn antenna, wherein the configuration of the measurement grid is based on a constant density 300 measurement grid and a constant density 10 measurement grid. In this example, the two density regions have a total of 25 measurement points. As in the previous example, a normalized gain threshold of −15 dB is used to determine the transition between the two initial constant density grids. As can be seen from the diagram 200B, the measurement point density for the measured values being above the defined threshold of −15 dB is identical to the measurement point density of the previous example. However, the measurement point density of the measured values being below the defined threshold is significantly reduced, since the constant density 10 grid provides less measurement points than the constant density 30 grid from the previous example. Thus, just by reducing the measurement grid density of one constant density measurement grid, the number of measurement points can be further decreased without increasing the measurement uncertainty noticeably.

As can be seen from the diagrams 210A (of FIG. 2D) and 200B (of FIG. 2E), a normalized gain threshold of −15 dB for the radiation emitted by the horn antenna was suitable to reduce measurement points without noticeably increasing measurement uncertainty. However, for a different antenna radiation pattern, any other threshold value can be selected and any other combination of two constant measurement grids having various densities is conceivable. Even a combination of more than two constant measurement grids to an adaptive grid is conceivable. Consequently, more than one transition criteria between different density areas can be determined. The adjustment of the measurement grid can be performed during a measurement, before or after a measurement, which offers a variety of possibilities to adjust the measurement grid for different radiation patterns, measurement conditions, accuracy requirements and measurement time requirements.

Further, the following table shows a comparison of derived total radiated power (TRP) measurement results with adaptive grids for a standard gain horn antenna. From the table it is apparent that using a constant density grid with less measurement points results in a significant deviation of the calculated TRP value for the standard gain horn antenna. However, adaptive density measurement grids show very good correlation of calculated TRP values even with a very small number of measurement points. Especially for antennas with a relatively high gain, adaptive density measurement grids are feasible.

| Measurement Grid | # of Measurement Points | TRP (dBm) |
|---|---|---|
| Constant Density 300 | 301 | 16.5 |
| Constant Density 100 | 109 | 16.5 |
| Constant Density 50 | 45 | 19.0 |
| Constant Density 40 | 41 | 16.3 |
| Constant Density 25 | 25 | 16.1 |
| Constant Density 20 | 25 | 21.1 |

Figure 3:
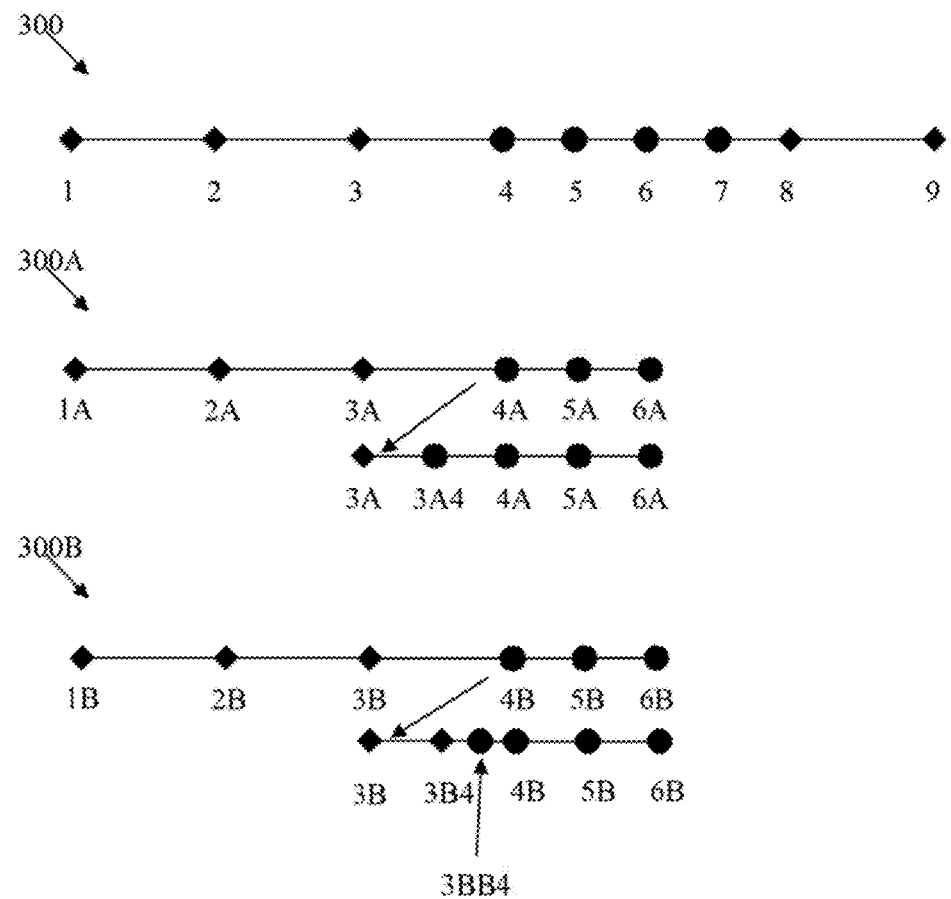
FIG. 3 shows an example of changing the measurement grid based on measurement values, in accordance with example embodiments of the present invention.

FIG. 3 shows an example of changing the measurement grid based on measurement values, in accordance with example embodiments of the present invention. The diagram 300 illustrates an example of defined measurement points 1 to 9. The measurement points 1, 2, 3 are equidistant, and the first three measurement values for each of the first three measurement points 1, 2, 3 are below a defined threshold. Therefore, the grid configuration is not adjusted. However, it is also conceivable to decrease the density of the grid when the values are below a defined threshold. As soon as the measured value of a measurement point, in this example measurement point 4, is above a threshold, the configuration of the grid changes. As can be seen by the diagram 300, the measurement points 4, 5, 6, 7, 8 are closer to each other than measurement points 1, 2, 3, 4, since each measured value of the measurement points 4, 5, 6, 7 is above a defined threshold.

It is also conceivable that each time the measured value is above a threshold, the distance between the measurement points decreases, and thus the measurement grid becomes denser with each measurement. The diagram 300 shows that the measurement grid becomes denser when the measured value is above a defined threshold and that the distance between each measurement point 4, 5, 6, 7, 8 is constant. To point out that the adjustment of the grid is dynamic, measurement point 8 with a value below a threshold is shown, and it can be seen that the configuration of the grid changes and the distance between measurement points 8 and 9 increases. In other words the measurement point density decreases.

The diagram 300A shows an alternative representation according to example embodiments of the present invention. To ensure that a possible measurement value of interest, between the measurement point having a measured value above a threshold 4A and the previous measurement point having a measured value below a threshold 3A, is not lost, the movement of the measurement antenna is controlled to define a new measurement point starting from the previous measurement point 3A before the grid configuration was changed. Starting from 3A, the new grid configuration is applied and a new measurement point 3A4 is defined. In this example, the new measurement point has a measured value above a defined threshold, and is thus a measurement value of interest. This measurement value would have been lost without going back to the previous measurement point and applying the denser grid configuration.

The diagram 300B shows a further representation according to example embodiments of the present invention. In the diagram 300B, as in the diagram 300A, a new measurement point 3B4 is defined, since the value of measurement point 4B exceeds a defined threshold. However, the new measurement point 3B4 has a measured value below a defined threshold. In this case, the measurement grid is made denser again and applied starting from the new measurement point 3B4 to refine the measurement. Doing so, an additional measurement point 3BB4 is defined. Defining an additional measurement point 3BB4 further increases measurement accuracy.

Figure 4:
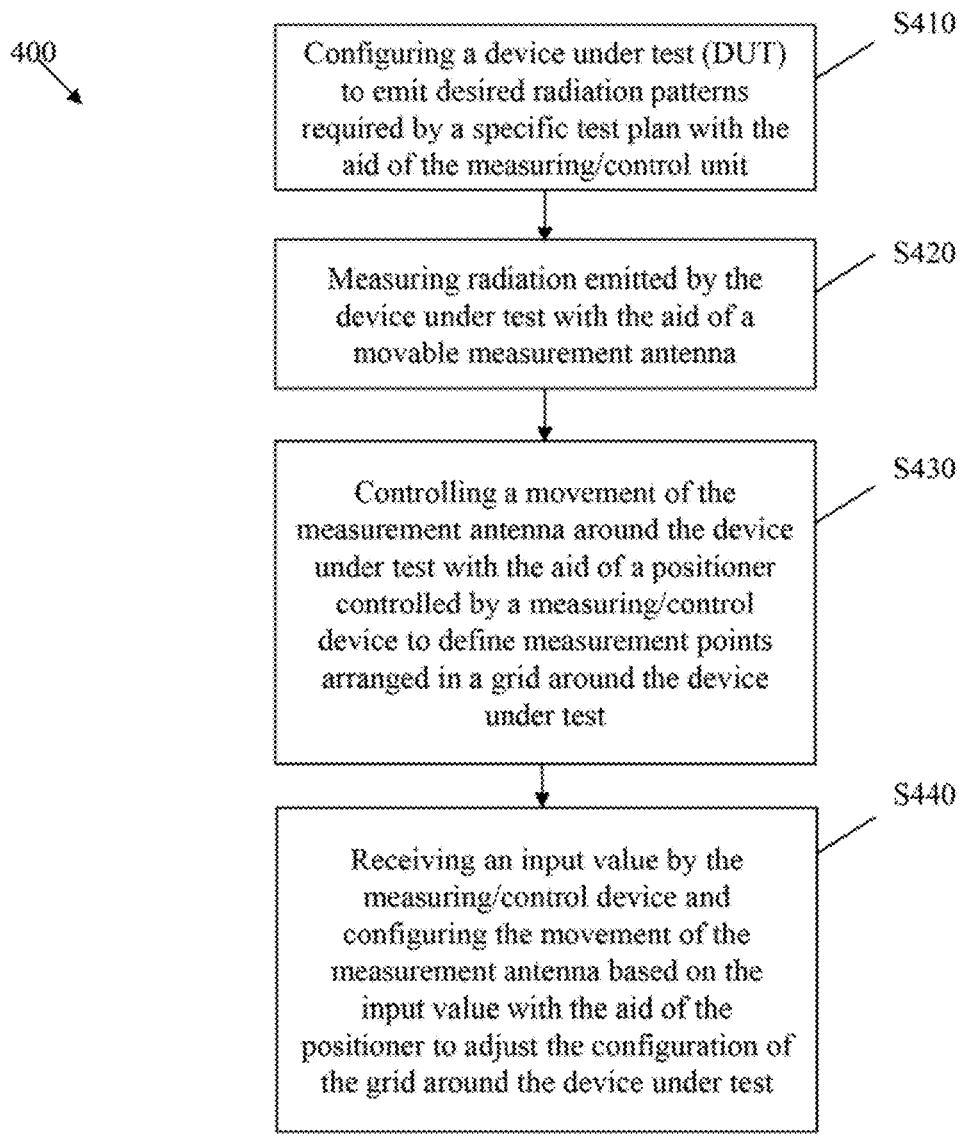
FIG. 4 shows a flow chart of an example method for over the air (OTA) measurements with a dynamic adjustable measurement grid, in accordance with example embodiments of the present invention.

FIG. 4 shows a flow chart of an example method for over the air (OTA) measurements with a dynamic adjustable measurement grid, in accordance with example embodiments of the present invention. In step S410, a test communication link to a DUT is established with the aid of a link antenna, and test communication data (including beam steering control data) is transmitted through the link antenna to the DUT, and beam steering of the DUT is controlled with the aid of a measuring/control device to configure the DUT to emit desired radiation patterns required by a specific test plan.

In step S420, electro-magnetic radiation emitted by the DUT is received with the aid of a movable measurement antenna. In step S430, the measurement antenna is moved around the DUT, for example, with the aid of a positioner controlled by the measuring/control device, to define measurement points arranged in a grid around the DUT. In step S440, an input value is received by the measuring/control device, and the movement and/or the receiving properties of the measurement antenna are configured based on the input value, for example, with the aid of the positioner and the measuring/control device, to adjust the configuration of the grid around the device under test.

While various embodiments of the present invention have been described above, it should be understood that they have been presented by way of example only, and not for limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A test system for over the air (OTA) measurements of a device under test (DUT) with a dynamic adjustable grid, comprising:
   a first device under test (DUT);
   at least one positioner;
   at least one measurement antenna; and
   at least one measuring/control processor; and
   wherein the measurement antenna is configured to measure several defined measurement points relative to the first DUT,
   wherein the measurement points are configured in a grid arranged around the first DUT, and
   wherein the configuration of the grid is based on an input value received by the measuring/control processor, wherein the input value consists of at least one parameter of at least one measured value or input data received from the first DUT.

2. The test system according to claim 1, wherein the input value is at least one parameter of at least one measured value or data of a second DUT.

3. The test system according to claim 2, wherein the measured value or data is taken from an actual or at least one previous measurement.

4. The test system according to claim 2, wherein the at least one parameter comprises one or more of a gradient of the measured value, a user defined measurement time, and a result of a comparison of the measured value with a defined threshold.

5. The test system according to claim 1, wherein the measured value or data is taken from an actual or at least one previous measurement.

6. The test system according to claim 1, wherein a configuration of the grid is such that the density of the grid is adjustable and can be decreased or increased.

7. The test system according to claim 6, wherein the grid is adjusted during the measurement.

8. The test system according to claim 6, wherein the grid is adjusted before or after a measurement.

9. The test system according to claim 1, wherein the at least one parameter comprises one or more of a gradient of the measured value, a user defined measurement time, and a result of a comparison of the measured value with a defined threshold.

10. The test system according to claim 9, wherein after an input value to increase the density of the grid has been received, starting from the previous measurement point the measurement is repeated with defined measurement points on a denser grid.

11. The test system according to claim 1, wherein the system further comprises a post-processor.

12. The test system according to claim 11, wherein the post-processor is configured to calculate from the measurement results at the different measurement points a defined figure of merit, or graph or distribution.

13. A method for over the air (OTA) measurements of a device under test (DUT) with a dynamic adjustable grid, the method comprising:
   configuring, by a measuring/control processor, the DUT to emit desired radiation patterns based on a respective test plan;
   measuring, by an adjustable measurement antenna, radiation emitted by the DUT;
   controlling movement of the adjustable measurement antenna around the DUT via a positioner controlled by the measuring/control processor to define measurement points for the measuring of the radiation emitted by the DUT, wherein the measurement points are configured in a grid arranged around the DUT; and
   receiving, by the measuring/control processor, an input value, wherein the configuration of the grid is based on the input value, and wherein the input value consists of at least one parameter of at least one measured value or input data received from the DUT or from a further DUT.

14. The method according to claim 13, wherein the method further comprises one or more of:
   calculating a gradient of a measured value; and
   performing a comparison of the at least one measured value with a defined threshold to determine the at least one parameter of the at least one measured value.

15. The method according to claim 13, wherein the method further comprises:
   adjusting the density of the grid during a measurement based on the measured value or data.

16. The method according to claim 13, wherein the method further comprises one or more of:

adjusting the density of the grid before or after a measurement based on the measured value or data; and performing an additional measurement starting from a previous measurement point after the grid density has been increased.

17. The method according to claim 13, wherein the the input value consists of a user defined measurement time.

18. The method according to claim 13, wherein the method further comprises:

calculating from the measurement results at the different measurement points a defined figure of merit, or a graph or a distribution.

* * * * *